(12) United States Patent
Chassoulier et al.

(10) Patent No.: US 11,408,719 B2
(45) Date of Patent: Aug. 9, 2022

(54) DEPLOYABLE DEVICE WITH CONTROL OF DEPLOYED LENGTH OF A DEPLOYABLE STRUCTURE

(71) Applicant: THALES, Courbevoie (FR)

(72) Inventors: Damien Chassoulier, Cannes la Bocca (FR); Valentin Bouchet, Cannes la Bocca (FR); Yannick Baudassé, Cannes la Bocca (FR); Morgan Pigeron, Cannes la Bocca (FR)

(73) Assignee: THALES, Courbevoie (FR)

( * ) Notice: Subject to any disclaimer, the term of this patent is extended or adjusted under 35 U.S.C. 154(b) by 428 days.

(21) Appl. No.: 16/711,325

(22) Filed: Dec. 11, 2019

(65) Prior Publication Data

US 2020/0191548 A1 Jun. 18, 2020

(30) Foreign Application Priority Data

Dec. 13, 2018 (FR) ...................................... 1872825

(51) Int. Cl.
| | | |
|---|---|---|
| *G01B 7/02* | (2006.01) | |
| *G01B 3/1003* | (2020.01) | |
| *B64G 1/10* | (2006.01) | |
| *B64G 1/22* | (2006.01) | |

(52) U.S. Cl.
CPC .............. *G01B 7/026* (2013.01); *B64G 1/10* (2013.01); *B64G 1/222* (2013.01); *G01B 3/1004* (2020.01)

(58) Field of Classification Search
CPC ........ G01B 7/026; G01B 3/1004; B64G 1/10; B64G 1/222
See application file for complete search history.

(56) References Cited

U.S. PATENT DOCUMENTS

| | | | |
|---|---|---|---|
| 2006/0272265 A1 | 12/2006 | Pryor | |
| 2012/0146880 A1* | 6/2012 | Behrens | ................. B64G 1/222 343/895 |

FOREIGN PATENT DOCUMENTS

| | | |
|---|---|---|
| EP | 0 858 946 A1 | 8/1998 |
| WO | 90/12736 A1 | 11/1990 |

* cited by examiner

*Primary Examiner* — Valentina Xavier
(74) *Attorney, Agent, or Firm* — BakerHostetler

(57) ABSTRACT

A deployable device includes a supporting structure, a deployable structure capable of switching from a configuration wound around a first axis to a configuration deployed according to a second axis substantially at right angles to the first axis, by being deployed by a length defined in a frame of reference of the supporting structure, wherein it further comprises a deployed length control device comprising a sensor and a computer linked to the sensor, a first conductive track electrically linked to the sensor extending on the deployable structure, substantially along the perimeter of the deployable structure, and forming one or more turns of a first coil in the wound configuration, and in that the sensor is configured to measure an electrical parameter from the first electrically conductive track which varies with the deployed length of the deployable structure and the computer is configured to determine the deployed length of the deployable structure.

10 Claims, 3 Drawing Sheets

DEPLOYABLE DEVICE WITH CONTROL OF DEPLOYED LENGTH OF A DEPLOYABLE STRUCTURE

CROSS-REFERENCE TO RELATED APPLICATIONS

This application claims priority to foreign French patent application No. FR 1872825, filed on Dec. 13, 2018, the disclosure of which is incorporated by reference in its entirety.

FIELD OF THE INVENTION

The present invention relates to a deployable device, for example tape-measure based. It applies notably to the field of space equipment which have to be deployed in orbit and, more particularly, to space equipment for satellites, such as antennas, solar generators, instruments. However, the invention applies to any other field in which it is desirable to control the deployed length of a deployable structure.

BACKGROUND

In this patent application, tape measures will be referred to as an example of deployable structure. This example is nonlimiting since the invention applies to any type of deployable structure. It can also concern flat tapes. In the space domain, tape measures are frequently used in the deployment. In stowed (or wound) configuration, the tape measures are wound around a mandrel. The deployment of the tape measures is ensured autonomously by the spontaneous unwinding thereof when the mandrel is free to rotate. The tape measures are known in the space field as being flexible tapes that have a section in the form of a circular arc whose radius of curvature is convex on a first face and concave on a second face, these tapes being able to switch from the wound state to the unwound state essentially by virtue of their own elastic energy. There are different types of tape having specific properties. Monostable tapes have a natural deployed position and need to be secured in stowed position. The monostable tape measures therefore have a natural tendency to deploy to return to their unwound state. The deployment of the monostable tapes is often anarchical and uncontrolled. Bistable tapes have two natural positions (wound position and deployed position) and do not need to be held in wound position when the section is totally flattened. Their deployment is linear and controlled.

In deployments and retractions of the deployable structure (for example a tape measure), it is sometimes necessary to know the exact position of the deployable structure, even following an electrical failure.

There are solutions in the field of deployable structures of tape measure type in which electromechanical components are used to satisfy this deployed length control function. It is for example known practice to use a brush potentiometer with reducing gear. The drawback with this solution is that the elements used are sensitive to the wear of the tracks with creation of dust that can create interference on the signal. Furthermore, it is necessary to use additional structural elements and a reducing gear, and the measurement obtained is that at the output of the mandrel but not of the output of the tape measure.

Another known solution consists in implementing mechanical sensors, but this remains difficult on a deployment of great length. Moreover, the sensors cannot always by adapted to different deployable structure configurations.

SUMMARY OF THE INVENTION

The invention aims to overcome all or part of the problems cited above by proposing a deployable device offering the advantage of occupying little bulk, being simple to produce, offering an optimization of the volume and of the weight of the assembly, allowing operation over great deployment lengths, with no contact, and that adapts to different deployable structure configurations. Furthermore, the invention is reliable and has little impact on the existing structure.

To this end, the subject of the invention is a deployable device comprising a supporting structure, a deployable structure capable of switching from a configuration wound around a first axis Z to a configuration deployed according to a second axis X substantially at right angles to the first axis Z, by being deployed by a length defined in a frame of reference of the supporting structure, characterized in that it further comprises a deployed length control device comprising a sensor and a computer linked to the sensor, a first conductive track electrically linked to the sensor extending on the deployable structure, substantially along the perimeter of the deployable structure, and forming one or more turns of a first coil in the wound configuration, and in that the sensor is configured to measure an electrical parameter from the first electrically conductive track which varies with the deployed length of the deployable structure and the computer is configured to determine the deployed length of the deployable structure.

According to one embodiment of the invention, an unwound end of the deployable structure is embedded in the supporting structure.

Advantageously, the computer and the sensor are positioned on the supporting structure.

According to another embodiment, the sensor comprises at least one second coil in proximity to the first coil positioned on the supporting structure, and the sensor is linked electrically to the first conductive track by mutual inductance between the first coil and the at least one second coil.

Advantageously, the deployable device according to the invention comprises at least one second conductive track electrically linked to the sensor extending on the deployable structure, substantially along the perimeter of the deployable structure, and forming one or more turns of a third coil in the wound configuration, and in that each of the first and second conductive tracks extends over a portion of width of the deployable structure.

Advantageously, the deployable structure is a tape measure.

The invention relates also to a satellite comprising at least one deployable device according to the invention.

The invention relates also to a method for controlling the deployed length of a deployable structure capable of switching from a configuration wound around a first axis Z to a configuration deployed according to a second axis X substantially at right angles to the first axis Z by being deployed by a defined length of a deployable device comprising a deployed length control device comprising a sensor and a computer linked to the sensor, a first conductive track electrically linked to the sensor extending on the deployable structure, substantially along the perimeter of the deployable structure, and forming one or more turns of a first coil in the wound configuration, the method comprising:

a first step of measurement, by the sensor, of an electrical parameter from the first electrically conductive track which varies with the deployed length of the deployable structure, a second step of determination, by the computer, of the deployed length of the deployable structure.

Advantageously, the deployable structure is a tape measure.

Advantageously, the method according to the invention comprises, beforehand, a single step of characterization of the deployed length of the deployable structure as a function of the measured electrical parameter.

Advantageously, the first measurement step comprises the following steps:

a step of resonating of the first coil by the computer (9) at a frequency whose value depends on the deployed length of the deployable structure, a step of measurement, by the sensor, of the resonance frequency of the first coil.

BRIEF DESCRIPTION OF THE DRAWINGS

The invention will be better understood and other advantages will become apparent on reading the detailed description of an embodiment given by way of example, the description being illustrated by the attached drawing in which.

In the interests of clarity, the same elements will bear the same references in the different figures.

DETAILED DESCRIPTION

The invention applies to any type of deployable structure, for example flat tapes, monostable or bistable tape measures. The implementation of monostable tape measures requires a more significant guiding effort. The bistable tape measures are preferred for the uniformity of their deployment. Furthermore, in wound configuration, they remain wound and, in deployed configuration, they remain deployed.

Figure 1:
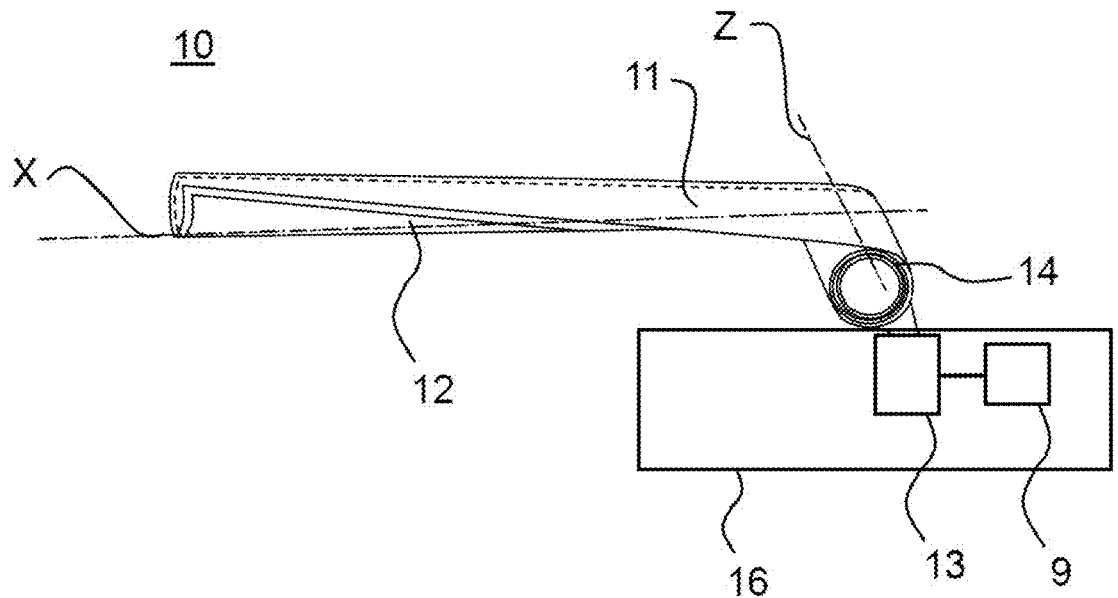
FIG. 1 schematically represents a deployable device with deployed length control device according to the invention.

FIG. 1 schematically represents a deployable device 10 with deployed length control device according to the invention. The deployable device 10 comprises a supporting structure 16, for example the body of a satellite, and a deployable structure 11, for example a tape measure, capable of switching from a configuration wound around a first axis Z to a configuration deployed according to a second axis X substantially at right angles to the first axis Z, by being deployed by a length defined in a frame of reference of the supporting structure 16. In other words, the deployable structure is positioned on the supporting structure 16 in wound position and extends from the supporting structure 16 along an axis X. Between the two wound and deployed configurations, the deployable structure can be in a multitude of intermediate configurations in which it is deployed, for each of these configurations, by a certain length that is sought to be determined.

According to the invention, the deployable device 10 further comprises a deployed length control device comprising a sensor 13 and a computer 9 linked to the sensor 13 and a first conductive track 12 electrically linked to the sensor 13 extending on the deployable structure 11, substantially along the perimeter of the deployable structure 11, and forming one or more turns of a first coil 14 in the wound configuration. Also, the sensor 13 is configured to measure an electrical parameter from the first electrically conductive track 12 which varies with the deployed length of the deployable structure 11 (and the form of the deployable structure) and the computer 9 is configured to determine the deployed length of the deployable structure 11. In other words, the invention relies on the measurement of the inductance (or of a quantity which varies with the inductance) induced by the form of the conductive track 12 wound on itself and/or more or less deployed according to the configuration of use. Any current of intensity i which flows generates a magnetic field through the section that it surrounds, and this is the magnetic flux. The inductance is the ratio between the duly obtained magnetic flux and the intensity i of the current.

Several embodiments can be envisaged. The computer 9 can be configured to resonate the first coil 14 using an oscillator then the sensor 13 can measure the resonance frequency of the coil. The form of the coil 14 (that is to say the number of turns that it forms depending on its current configuration, i.e. completely wound, partially wound or completely deployed) has an impact on the value of the resonance frequency.

It is possible for the computer 9 to be configured to inject a voltage pulse at the terminals of the conductive track. The system then oscillates over a few periods, and the sensor 13 measures the frequency.

Likewise, the computer 9 can be configured to inject a sinusoidal voltage, for example of constant frequency and amplitude, at the terminals of the conductive track and measure the amplitude of the current and the phase shift which results therefrom between the voltage and the current. When the deployable structure 11 is deployed, the amplitude and the phase (relative to the voltage) of the current changes. The amplitude and the phase of the current represent an image of the deployed length. It can be noted that the same principle applies by replacing the voltage with a current and the current with a voltage.

The measurement of an electrical quantity (frequency, phase shift and/or amplitude) which varies with the deployed length and the form of the deployable structure makes it possible to determine the deployed length of the deployable structure, reliably and with simple acquisition electronics.

The correlation between the electrical quantity and the deployed length can be established by means of calculations or else through a preliminary step of characterization performed on the ground, as explained later.

The electrically conductive track 12 can be a copper-plated element of flexile PCB type, making it possible to reduce to the maximum the overall thickness of the deployable structure with track. It can also be a conventional clad wire in the resin of the tape measure or glued on top, an enamelled coil-winding wire (copper and enamel) a few micrometres thick and which withstands high temperatures of the order of 200° C. without requiring a significant thickness of insulation. In this embodiment, the conductive track 12 is the sensor 13. In other words, it is the track 12 which picks up the signal.

Advantageously, and as represented in FIG. 1, the computer 9 and the sensor 13 are positioned on the supporting structure 16.

In the embodiment represented schematically in FIG. 1, the deployable structure has a free end. This embodiment is also called "one-way pylon".

In the embodiment represented schematically in FIG. 1, the sensor 13 is linked to the conductive track 12 at the first coil 14. In this configuration, it is essential to manage the winding of the wires linking the first coil 14 to the sensor 13. This solution can be envisaged for a small winding of a few turns, requiring only a short length of wires. For larger windings, there are other solutions that are possible and compatible with the invention, so as not to limit the number of turns, for example by using a transfer apparatus such as a revolving collector, a roller collector (also known as roll ring) or a rotating transformer.

Figure 2:
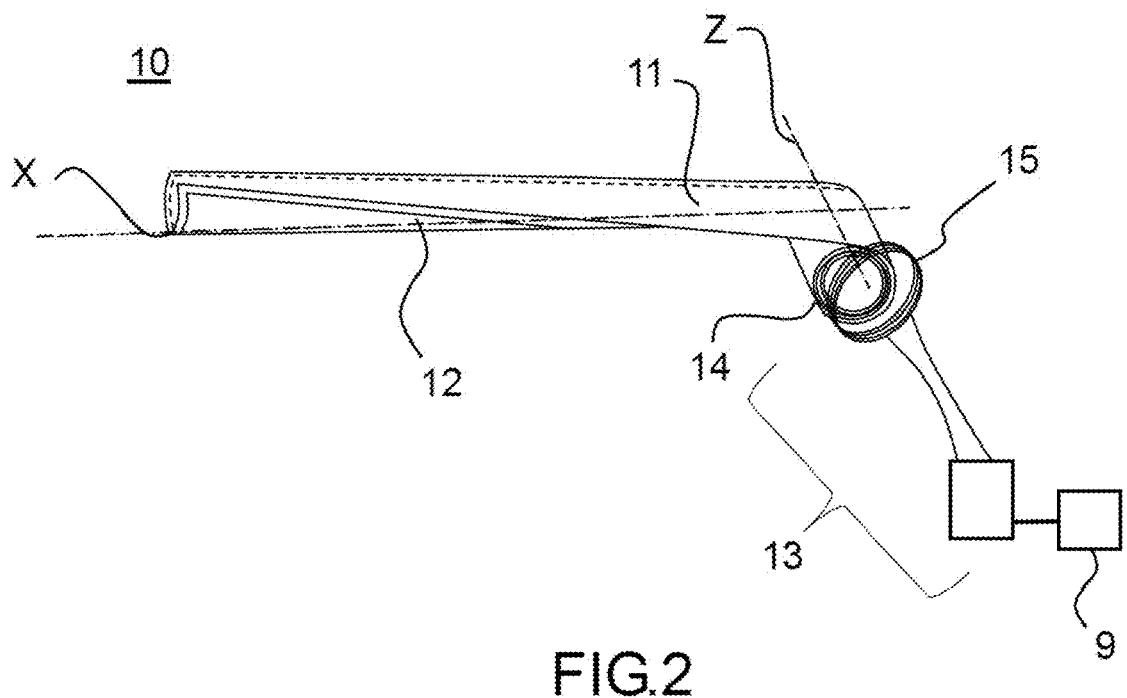
FIG. 2 schematically represents a variant of a deployable device with deployed length control device according to the invention.

FIG. 2 schematically represents a variant of a deployable device 10 with deployed length control device according to the invention. In this variant, the sensor 13 comprises at least one second coil 15 in proximity to the first coil 14 positioned on the supporting structure 16, and the sensor 13 is linked electrically to the first conductive track 12 by mutual inductance between the first coil 14 and the at least one second coil 15. The first coil 14 is closed on itself, preferably short-circuited, but can have an internal impedance-matching circuit (resistance, inductance and capacitance). Thus, the deployable structure 11 is free to be deployed and/or to be wound, without winding strain on the wires linked to the sensor 13. With two coils 14, 15 in proximity to one another, one of the coils influences the other. Thus, the mutual inductance varies with the inductance of each coil 14, 15, as a function of the characteristics (that is to say number of turns of coil 14) of each coil.

Figure 3:
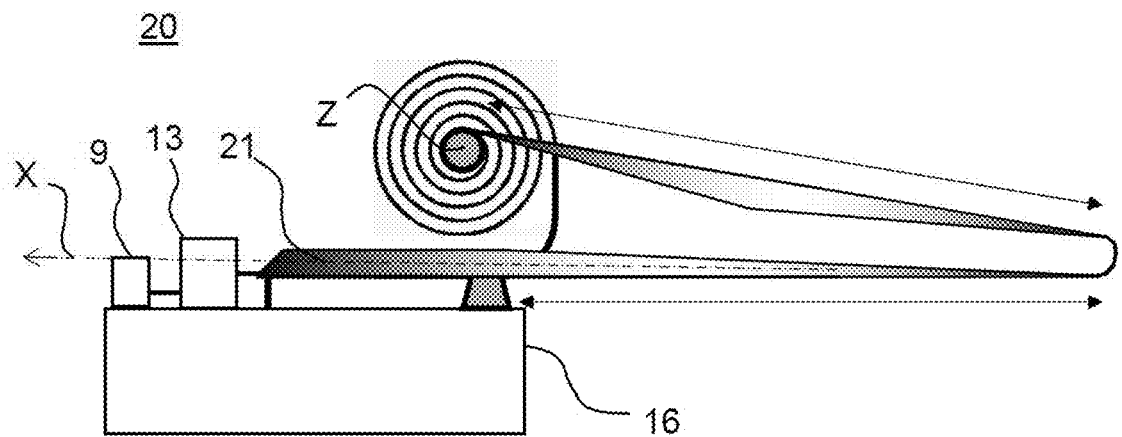
FIG. 3 schematically represents another embodiment of a deployable device with deployed length control device according to the invention.

FIG. 3 schematically represents another embodiment of a deployable device 20 with deployed length control device according to the invention. In this embodiment, an unwound end 21 of the deployable structure 11 is embedded in the supporting structure 16. This embodiment is also called "opposing pylon".

In this embodiment, the sensor can therefore easily be positioned on the supporting structure 16, without winding strain on the wires since the end 21 is embedded in the supporting structure. However, it is also possible to envisage combining the "opposing pylon" configuration with a second coil 15, to use the mutual inductance as explained previously.

Figure 4:
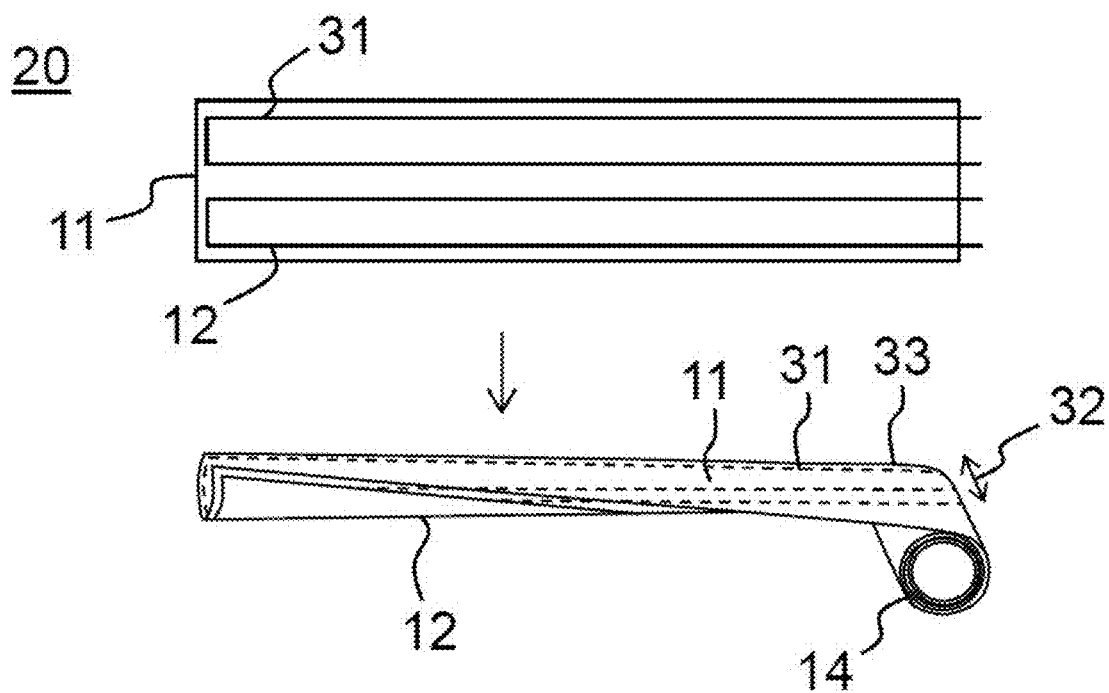
FIG. 4 schematically represents another embodiment of a deployable device with deployed length control device according to the invention.

FIG. 4 schematically represents another embodiment of a deployable device 30 with deployed length control device according to the invention. In this embodiment, the deployable device 30 comprises at least one second conductive track 31 electrically linked to the sensor 13 extending on the deployable structure 11, substantially along the perimeter of the deployable structure 11, and forming one or more turns of a third coil 33 in the wound configuration, and each of the first and second conductive tracks 12, 31 extends over a portion of width 32 of the deployable structure 11. Each track is ideally situated close to the edge of the deployable structure, but can also be less close to the edge. It is preferable for each track not to intersect. In other words, each track extends longitudinally without being crossed and without crossing another track. The top of FIG. 4 shows a plan view of the deployable structure 11 on which the positioning of the two tracks 12 and 31 can be seen. This embodiment allows conductive track redundancy in case of failure of one of the two tracks.

Advantageously, the two tracks 12, 31 are spaced apart from one another, so as to reduce the influence (the mutual inductance) of one on the other. In other words, the two tracks 12, 31 run side-by-side with a distance between the two tracks. Because of the distance, the result thereof is an inductance of each coil that is thus obtained which is reduced and therefore a loss in gain, but that at the same time makes it possible to reduce the influence between the so-called nominal track and the so-called redundant track without completely losing in terms of gain on each of the channels.

Figure 5:
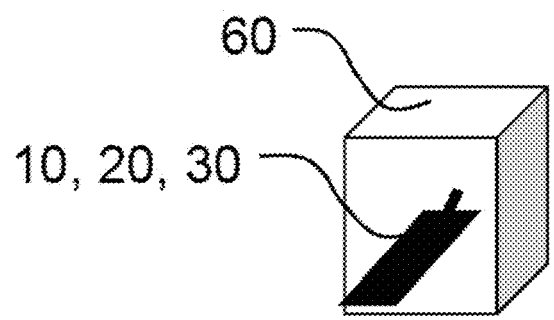
FIG. 5 schematically represents a satellite equipped with a deployable device according to the invention.

FIG. 5 schematically represents a satellite 60 equipped with a deployable device according to the invention.

Figure 6:
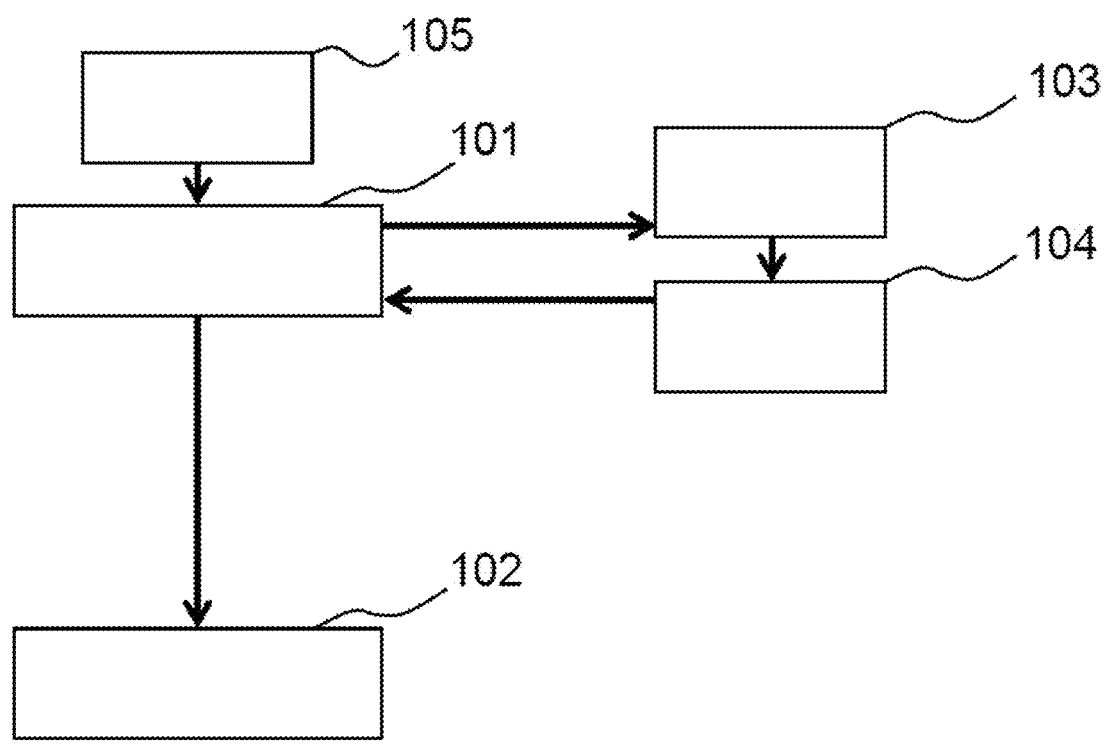
FIG. 6 schematically illustrates the steps of a method for controlling the deployed length according to the invention.

FIG. 6 schematically illustrates the steps of a deployed length control method according to the invention. The method for controlling the deployed length of a deployable structure 11 capable of switching from a configuration wound around a first axis Z to a configuration deployed according to a second axis X substantially at right angles to the first axis Z by being deployed by a defined length of a deployable device 10 comprising a deployed length control device comprising a sensor 13 and a computer 9 linked to the sensor 13 and a first conductive track 12 electrically linked to the sensor 13, physically or by mutual inductance, extending on the deployable structure 11, substantially along the perimeter of the deployable structure 11, and forming one or more turns of a first coil 14 in the wound configuration, comprises a first step 101 of measurement, by the sensor 13, of an electrical parameter from the first electrically conductive track 12 which varies with the deployed length of the deployable structure 11, and a second step 102 of determination, by the computer 9, of the deployed length of the deployable structure 11.

Advantageously, the method according to the invention comprises, beforehand, a single step 105 of characterization of the deployed length of the deployable structure 11 as a function of the measured electrical parameter. Generally, this step 105 is performed by means of a modelling of the device as a whole, and for different deployed lengths, the corresponding electrical parameter is watched. Alternatively, the step 105 can be performed by a measurement in a white room but the size of the room can be a limiting factor which necessitates performing the measurements up to a certain distance and extrapolating beyond the limit imposed by the room. The characterization step 105 can be performed just once and makes it possible to have a correlation between the electrical parameter and the deployed length.

According to one embodiment of the method according to the invention, the first measurement step 101 can comprise a step 103 of resonating of the first coil 14 by the computer 9 at a frequency whose value depends on the deployed length of the deployable structure 11, and a step 104 of measurement, by the sensor 13, of the resonance frequency of the first coil 14.

The invention claimed is:

1. A deployable device comprising:
 a supporting structure,
 a deployable structure capable of switching from a configuration wound around a first axis (Z) to a configuration deployed according to a second axis (X) substantially at right angles to the first axis (Z), by being deployed by a length defined in a frame of reference of the supporting structure,
 wherein it further comprises a deployed length control device comprising:

a sensor and a computer linked to the sensor,
- a first conductive track electrically linked to the sensor extending on the deployable structure, substantially along the perimeter of the deployable structure, and forming one or more turns of a first coil in the wound configuration,
- and in that the sensor is configured to measure an electrical parameter from the first electrically conductive track which varies with the deployed length of the deployable structure and the computer is configured to determine the deployed length of the deployable structure.

2. The deployable device according to claim 1, wherein an unwound end of the deployable structure is embedded in the supporting structure.

3. The deployable device according to claim 1, wherein the computer and the sensor are positioned on the supporting structure.

4. The deployable device according to claim 1, wherein the sensor comprises at least one second coil in proximity to the first coil positioned on the supporting structure, and in that the sensor is linked electrically to the first conductive track by mutual inductance between the first coil and the at least one second coil.

5. The deployable device according to claim 4, wherein it comprises at least one second conductive track electrically linked to the sensor extending on the deployable structure, substantially along the perimeter of the deployable structure, and forming one or more turns of a third coil in the wound configuration, and in that each of the first and second conductive tracks extends over a portion of width of the deployable structure.

6. The deployable device according to claim 1, wherein the deployable structure is a tape measure.

7. A satellite, wherein it comprises at least one deployable device according to claim 1.

8. A method for controlling the deployed length of a deployable structure capable of switching from a configuration wound around a first axis (Z) to a configuration deployed according to a second axis (X) substantially at right angles to the first axis (Z) by being deployed by a length defined in a frame of reference of a supporting structure of a deployable device comprising a deployed length control device comprising:
- a sensor and a computer linked to the sensor,
- a first conductive track electrically linked to the sensor extending on the deployable structure, substantially along the perimeter of the deployable structure, and forming one or more turns of a first coil in the wound configuration, wherein the method comprises:
- a first step of measurement, by the sensor, of an electrical parameter from the first electrically conductive track which varies with the deployed length of the deployable structure,
- a second step of determination, by the computer, of the deployed length of the deployable structure.

9. The control method according to claim 8, wherein it comprises, beforehand, a single step of characterization of the deployed length of the deployable structure as a function of the measured electrical parameter.

10. The control method according to claim 8, wherein the first measurement step comprises the following steps:
- a step of resonating of the first coil by the computer at a frequency whose value depends on the deployed length of the deployable structure,
- a step of measurement, by the sensor, of the resonance frequency of the first coil.

* * * * *